United States Patent [19]

McDowell et al.

[11] 3,942,014

[45] Mar. 2, 1976

[54] LOGIC ELEMENTS FOR REACTOR PERIOD METER

[75] Inventors: William P. McDowell; James P. Bobis, both of Downers Grove, Ill.

[73] Assignee: The United States of America as represented by the United States Energy Research and Development Administration, Washington, D.C.

[22] Filed: Mar. 20, 1975

[21] Appl. No.: 560,429

[52] U.S. Cl. .............................. 250/392; 250/374
[51] Int. Cl.² ..................... G01T 3/00; G01T 1/18
[58] Field of Search .......... 250/390, 391, 392, 374, 250/375

[56] References Cited
UNITED STATES PATENTS

| | | | |
|---|---|---|---|
| 3,609,734 | 9/1971 | Svansson .................... | 250/390 X |
| 3,761,712 | 9/1973 | Listerman .................. | 250/392 X |
| 3,875,410 | 4/1975 | Luger ........................ | 250/374 |
| 3,898,467 | 8/1975 | Schukei et al. ............ | 250/390 |

Primary Examiner—Archie R. Borchelt
Attorney, Agent, or Firm—Dean E. Carlson; Arthur A. Churm; Paul A. Gottlieb

[57] ABSTRACT

Logic elements are provided for a reactor period meter trip circuit. For one element, first and second inputs are applied to first and second chopper comparators, respectively. The output of each comparator is O if the input applied to it is greater than or equal to a trip level associated with each input and each output is a square wave of frequency $f$ if the input applied to it is less than the associated trip level. The outputs of the comparators are algebraically summed and applied to a bandpass filter tuned to $f$. For another element, the output of each comparator is applied to a bandpass filter which is tuned to $f$ to give a sine wave of frequency $f$. The outputs of the filters are multiplied by an analog multiplier whose output is 0 if either input is 0 and a sine wave of frequency $2f$ if both inputs are a frequency $f$.

9 Claims, 1 Drawing Figure

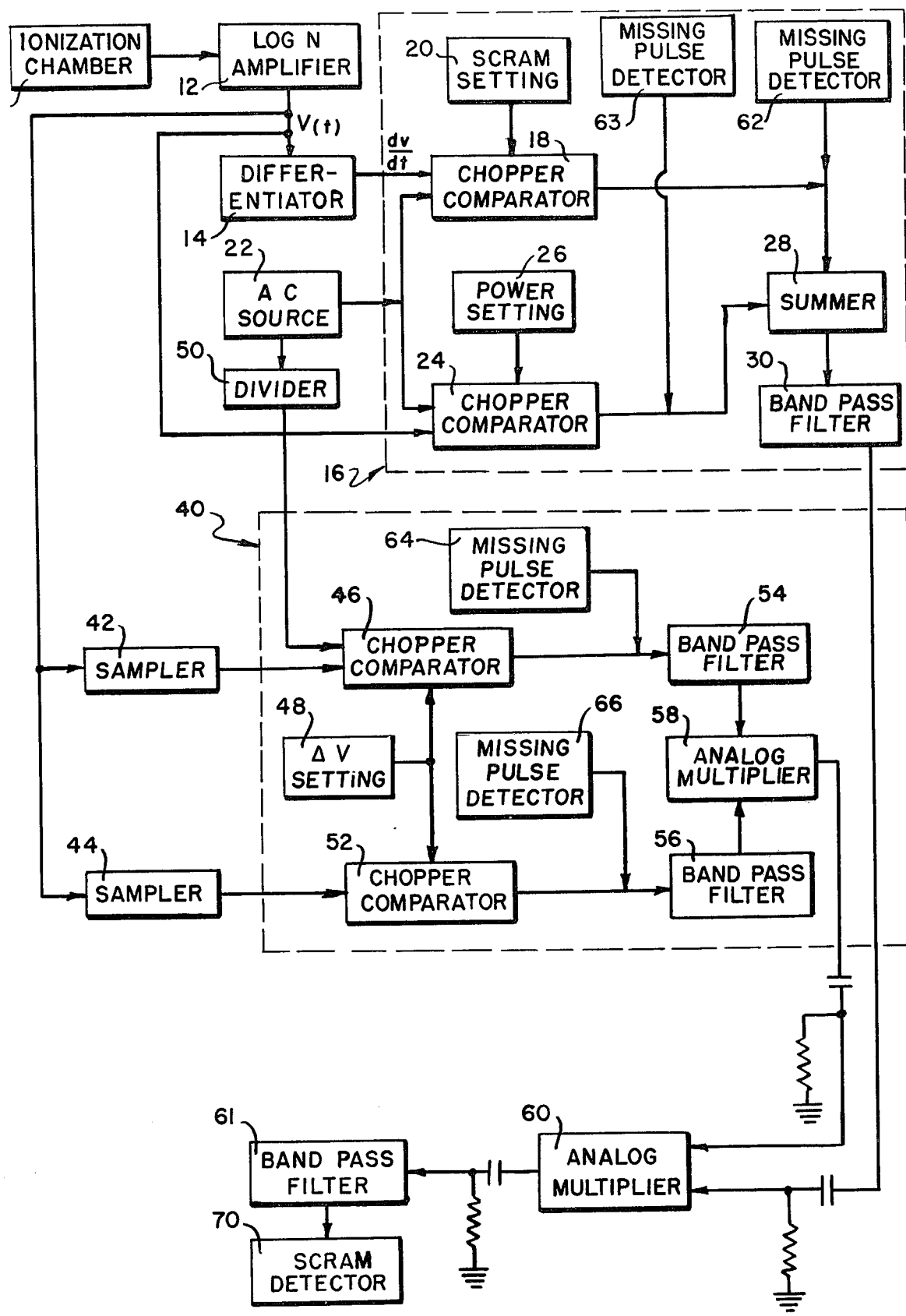

… …

LOGIC ELEMENTS FOR REACTOR PERIOD METER

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

A reactor period meter is a device for monitoring a reactor's period T. With the reactor period below a critical value, that is, it is too short, the power level is increasing too quickly. A reactor scram signal should be initiated by the reactor period meter, indicating the reactor power should be reduced. Such a meter includes means for developing a signal proportional to reactor period and logical elements for determining whether the reactor period indicated by the signal is at a critical scram level. For use in a reactor period meter, such logic elements should be fail safe, and should indicate scram condition with the reactor period at the scram level and it should indicate scram condition with failure of any of the components of the period meter. With D.C. digital, logical elements, failure of the logic elements themselves might not necessarily cause a scram signal to be generated by the meter. Thus, constant checking of the meter in a nonoperational condition is required.

It is therefore an object of this invention to provide fail safe logic elements.

Another object of this invention is to provide fail safe logic elements for a reactor period meter.

SUMMARY OF THE INVENTION

For a reactor period meter trip circuit, there is provided an analog logical gate for indicating the value of a first input signal being greater than a first trip level and simultaneously the value of the second input signal being in excess of the second trip level, much like a logical AND gate. The first and second input signals are applied to first and second chopper comparators respectively. The output of each comparator will be 0 if the input applied to it is greater than or equal to a trip level associated with the respective input. If the input is less than the associated trip level, then the corresponding comparator develops a square wave output of frequency $f$. The outputs of the comparators are summed and applied to a bandpass filter tuned to the frequency $f$. If the output of the bandpass filter is 0, that indicates that both of the inputs have exceeded their associated trip levels simultaneously. If the output of the bandpass filter is a sine wave of frequency $f$, then the inputs have not simultaneously exceeded their respective trip levels.

A further logic element indicates a condition of the value of either of two input signals being in excess of respective trip levels regardless of their occurring simultaneously, much like a logical OR gate. Each input signal is applied to a chopper comparator which obeys the relationships previously described for the other logic element. The output of each of these comparators is applied to a bandpass filter tuned to the frequency $y$ of the output signal of the comparators. The outputs of these filters are multiplied together by an analog multiplier. The output of the multiplier will be 0 if either of the filters has a 0 output and will be a sine wave of frequency $2y$ if both are at a $y$ frequency.

BRIEF DESCRIPTION OF THE DRAWING

The drawing is a block diagram showing logic elements of an improved reactor period meter.

DETAILED DESCRIPTION OF THE PREFERRED EMBODIMENT

Referring to the drawing, there is shown a reactor period meter with fail safe logic elements. The reactor period meter shown in the drawing is a log N-type meter having an ionization chamber 10 which develops a signal proportional to the neutron flux density for power level of the reactor (not shown). The neutron flux density is proportional to reactor power level. The output of the chamber 10 is applied to log N amplifier 12. The output of log N amplifier 12 is proportional to the log of the reactor power level. The type of meter shown in the drawing has two circuits for determining reactor period. One circuit is limited to high power levels, while the other functions at all reactor power levels. This is more particularly described in U.S. Pat. application Ser. No. 509,971(70) filed Sept. 27, 1974. The present application relates to particular fail safe logic elements incorporated into such a reactor period meter.

The output V of log N amplifier 12 is applied to differentiator 14 whose output is proportional to $dV/dt$. The output of differentiator 14 is applied to a fail safe logical element 16 which determines whether $dV/dt$ is greater than a particular critical value and simultaneously whether V is greater than a predetermined number. The $dV/dt$ comparison tests the critical reactor period while the V comparison tests the reactor power level. Logic element 16 is designed so that at high power levels $dV/dt$ is used to monitor reactor period.

The $dV/dt$ signal is applied to chopper comparator 18. A chopper comparator is a device which chops a resulting D.C. signal determined by subtracting from a reference D.C. an applied signal. Only if the subtraction is positive will the resulting D.C. signal be chopped. However, if the subtraction is negative or 0, the output of chopper comparator 18 will be 0. Chopping means that the comparator generates a square wave in response and proportional to the amplitude of the positive resulting D.C. signal. The frequency of the square wave will be equal to that of a reference A.C. signal applied to the chopper comparator. In the drawing, the chopper comparator 18 compares the value of the applied input signal $dV/dt$ signal with a particular D.C. scram level established by scram setting 20. If $dV/dt$ is greater than the D.C. scram level, comparator 18 will chop the positive resulting D.C. signal. The chopped square wave will have a frequency equal to the frequency of an A.C. reference signal, which in this embodiment is a 1 KHz signal developed by A.C. source 22. The actual reference A.C. signal is chosen for convenience. If the D.C. scram level is not exceeded by the $dV/dt$ signal, the output of comparator 18 is 0. Simultaneously, the output of log N amplifier 12 is applied to chopper comparator 24 which compares the value of V with a D.C. power level established by power setting 26. If V is equal to or exceeds the D.C. power level, comparator 24 develops a 0 output. If the V signal is greater than the D.C. power level, then the output of chopper comparator 24 is a square wave of frequency equal to the reference A.C. signal applied to comparator 24 by A.C. source 22. In logic element 16 this frequency is the same as that applied to comparator 18, which in this embodiment is 1 KHz.

The outputs of comparators 18 and 24 are superposed or added by summer 28. The summation of chopper comparators 18 and 24 is then applied to a bandpass filter 30. The frequency to which the filter is tuned is equal to that of the reference A.C. signal applied to chopper comparators 18 and 24, which in this embodiment is 1 KHz. As is well known, a bandpass filter will pass any sine wave or frequency approximately equal to the frequency to which it is tuned. Therefore, since the summation of the output comparators 18 and 24 is either a square wave of frequency 1 KHz to which the bandpass filter is tuned or 0, the output of bandpass filter 30 will be a sine wave of the reference frequency or will be 0. Note that a square wave is merely a superposition of a multitude of sine waves so that applying a square wave to a bandpass filter yields an output sine wave at the relative frequency of a square wave. Note that if the comparators have malfunctioned and are developing signals other than at the reference A.C. signal, the output of bandpass filter 30 will be due to the nonreference A.C. frequency signals and of 0 magnitude.

The action of the combination of the comparators 18 and 24 in filter 30 is better understood with reference to the following truth table:

TABLE I

| dV/dt | ≤ D.C. scram level | ≤ D.C. scram level | > D.C. scram level | > D.C. scram level |
|---|---|---|---|---|
| V | ≤ D.C. power level | > D.C. power level | ≤ D.C. power level | > D.C. power level |
| Output of filter 30 | 1 KHz sine wave | 1 KHz sine wave | 1 KHz sine wave | 0 |

Thus, when dV/dt is less than the D.C. scram level, the subtraction of dV/dt from the D.C. scram level will be positive and the output of comparator 18 will be a 1 KHz square wave. This results in filter 30 having a 1 KHz sine wave output regardless of the condition of comparator 24. Similarly, when V is less than the D.C. power level, comparator 24 will have a 1 KHz square wave output which results in filter 30 having a 1 KHz sine wave output regardless of the position of comparator 18. However, if dV/dt is greater than the D.C. scram level, and simultaneously V is greater than the D.C. power level, both comparators 18 and 24 will have 0 outputs, resulting in the output of filter 30 being 0. Since 0 output of filter 30 indicates scram, this logical element 16 functions much like an AND gate.

Logical element 40 determines whether the reactor period is too fast by comparing the change in V over a predetermined time interval with a predetermined number and develops a scram signal if the predetermined number is exceeded by the change in V. Two separate comparisons, noncoincident in time but lasting for identical time intervals, are taken and, if either indicates scram condition, a scram signal is to be generated. ΔV sampler 42 develops a new output signal each particular time period. The output signal of sampler 42 represents the change in V over the particular time interval. Similarly, ΔV sampler 44 develops a new output signal each particular time interval equal to the change in V over the particular time interval. The time intervals for each sampler 42 and 44 are equal in duration but are not coterminous. The output of sampler 42 is applied to chopper comparator 46 where it is compared with the D.C. ΔV level established by ΔV setting 48. With the output of sampler 42 less than the D.C. ΔV level, a square wave is developed by comparator 46. The reference A.C. signal which determines the frequency of the square wave is developed in this embodiment by A.C. source 22. Here, the 1 KHz signal is divided by two by frequency divider 50 to give a reference A.C. signal having a frequency of 500 HZ. When the signal from sampler 46 is equal to or exceeds the D.C. ΔV level, then the output of comparator 46 is 0. In the same manner, the output of sampler 44 is applied to chopper comparator 52 whose D.C. reference signal is equal to that of comparator 46 and is also established by ΔV setting 48 and whose A.C. reference signal is also the 500 HZ from divider 50. The same output conditions which governed comparator 46 also govern comparator 52. The output of each comparator 46 and 52 is applied to a bandpass filter, 54 or 56, respectively. Filters 54 and 56 are tuned to the A.C. reference frequency of comparators 46 and 52 which, in this case, is 500 HZ. The purpose of filters 54 and 56 is to convert any square wave developed by comparators 46 and 52 to a sine wave at the same frequency as the reference frequency. The outputs of the filters 54 and 56 are applied to an analog multiplier 58. An analog multiplier is a device which, in response to two sine wave inputs of frequency $\omega_1$ and $\omega_2$, develops an output of the form $$\cos(\omega_1 + \omega_2) - \cos(\omega_1 - \omega_2)$$

If the outputs of both filters 54 and 56 are both at 500 HZ, then the output of multiplier 58 will be sine sin wave of frequency 1 KHz. However, if the output of either filter 54 or filter 56 is 0, then the output of multiplier 58 will be 0. The action of the combination of comparators 46 and 52, filters 54 and 56, and multiplier 58 is better understood with reference to the following truth table:

TABLE II

| V Sampler 42 output | ≤ D.C. ΔV level | > D.C. ΔV level | ≤ D.C. ΔV level | > D.C. ΔV level |
|---|---|---|---|---|
| V Sampler 44 output | ≤ D.C. ΔV level | ≤ D.C. ΔV level | > D.C. ΔV level | > D.C. ΔV level |
| Multiplier 58 output | 1 KHz sine | 0 | 0 | 0 |

Thus, when the output of sampler 42 is less than the D.C. ΔV level, comparator 46 develops a 500 HZ signal, and when the output of sampler 42 is greater than or equal to the D.C. V level, comparator 46 develops a 0 output. The same rule governs the operation of comparator 52 with respect to the output of sampler 44. The output of multiplier 58 will be 0 if the output of either chopper is 0 and will by a 1 KHz signal if both are at 500 HZ. Since 0 indicates scram condition, logic element 40 can be said to function like an OR gate.

The outputs of filter 30 and multiplier 58 are applied to analog multiplier 60. The reference frequencies have been established so that the outputs of filter 30 and multiplier 58 are both either 0 or a 1 KHz sine wave depending upon whether a scram condition or a nonscram condition exists according to logic elements 16 and 40. The output of multiplier 60 will be governed by the same multiplication rule as for multiplier 58 and will be 0 if either input or both inputs are 0 and will be a 2 KHz sine wave if both inputs are 1 KH signals. The output of multiplier 60 is applied to bandpass filter 61 which is tuned to a frequency of 2 KHz in this embodiment. Thus the output of filter 61 will either be 0 or 2 KHz depending upon the output of multiplier 60. If a component of the meter has failed, the output of multiplier 60 may be a sine wave of frequency of 2 KHz. Filter 61 responds to such a signal with a 0 output. A scram should be generated if the output of filter 61 is 0. This is done by scram reactor circuit 70.

Because the logic elements are A.C. they are fail safe. If at any time one of the components of the element fails, the filter 61 will have an output of 0 since the frequencies of its two inputs will not match up. Further redundancy can be provided by examining the output of each chopper individually with a missing pulse detector which for each chopper is 62, 63, 64 and 66. A missing pulse detector might be a retriggerable monostable multivibrator. When it receives a pulse from the comparator, a capacitor is charged and when the pulse ends the capacitor is discharged. If a pulse is missing, the capacitor continues to charge and the excess charge can be detected, showing a missing pulse.

To those skilled in the art, the particular selection of A.C. reference frequencies and of filters would be apparent. Also various combinations of the basic logic elements disclosed to perform a variety of logical operations would also be apparent.

The embodiments of the invention in which an exclusive property or privilege is claimed are defined as follows:

1. A logical device for indicating the condition of the value of a first input signal being equal to or greater than a first trip level and simultaneously the value of a second input signal being equal to or greater than a second trip level, comprising:

first DC means for developing a first DC signal corresponding to the first trip level, a first chopper comparator having the first input signal applied thereto and being coupled to said first DC means, said first comparator being responsive to the first input signal and said first DC signal to develop a first comparator signal, with the first input signal less than said first DC signal said first comparator signal being a square wave of frequency $f$ and with the first input signal equal to or greater than said first DC signal said first comparator signal having 0 value, second DC means for developing a second DC signal corresponding to the second trip level, a second chopper comparator having the second input signal applied thereto and being coupled to said second DC means, said second comparator being responsive to the second input signal and said second DC signal to develop a second comparator signal, with the second input signal less than said second DC signal said second comparator signal being a square wave of frequency $f$ and with the second input signal equal to or greater than said second DC signal said second comparator signal having 0 value, and a first bandpass filter tuned to frequency $f$ and being coupled to said first and second comparators and being responsive to said first and second comparator signals to develop a first AC alarm signal of frequency $f$ with either of said comparator signals of frequency $f$ and having zero value with both said comparator signals not of frequency $f$.

2. The device of claim 1 further including a first missing pulse detector coupled to said first comparator and being responsive to said first comparator signal having a nonregular square wave form to develop a first missing pulse alarm and a second missing pulse detector coupled to said second comparator and being responsive to said second comparator signal having a nonregular square wave form to develop a second missing pulse alarm.

3. The device of claim 2 further including means for developing a second AC alarm signal of frequency f with either of third and fourth input signals being equal to or greater than third and fourth trip levels respectively and a first analog frequency multiplier coupled to said means for developing a second AC alarm signal and said first bandpass filter and being responsive to said first and second AC alarm signals to develop an output signal, with either of said AC alarm signals having zero value said output signal having 0 value and with both of said AC alarm signals of frequency $f$ said output signal having a frequency of $2f$.

4. The device of claim 3 further including a second bandpass filter tuned to frequency $2f$ coupled to said first analog multiplier and being responsive to said output signal to develop a scram signal of frequency $2f$ with the output signal of said first analog multiplier having frequency $2f$ and of zero value with said output signal of said first analog multiplier not of frequency $2f$.

5. The device of claim 4 wherein said means for developing a second AC alarm signal includes third DC means for developing a third DC signal corresponding to said third trip level, a third chopper comparator having applied thereto said third DC signal and being coupled to said third DC means, said third comparator being responsive to said third input signal and said third DC signal to develop a third comparator signal, with said third input signal less than said third DC signal said third comparator signal being a square wave of frequency ½ $f$ and with said third input signal equal to or greater than said third DC signal said third comparator signal having 0 value, fourth DC means for developing a fourth DC signal corresponding to said fourth trip level, a fourth chopper comparator having applied thereto said fourth DC signal and being coupled to said fourth DC means, said fourth comparator being responsive to said fourth input signal and said fourth DC signal to develop a fourth comparator signal, with said fourth input signal less than said fourth DC signal said fourth comparator signal being a square wave of frequency ½ $f$ and with said fourth input signal equal to or greater than said fourth DC signal said fourth comparator signal having zero value, a third bandpass filter tuned to frequency ½ $f$ coupled to said third comparator and being responsive to the comparator signal thereof to develop a third AC alarm signal of frequency ½ $f$ with the comparator signal applied thereto of frequency ½ $f$ and of zero value with the comparator signal applied thereto not of frequency ½ $f$, a fourth bandpass filter tuned to frequency ½ $f$ coupled to said fourth comparator and being responsive to the comparator signal thereof to develop a fourth AC alarm signal of frequency ½ $f$ with the comparator signal applied thereto of frequency ½ $f$ and of zero value with the comparator signal applied thereto not of frequency ½ $f$, and a second analog frequency multiplier coupled to said third and fourth bandpass filters and being responsive to said third and fourth AC alarm signals to develop said second AC alarm signal, with either of said third and fourth AC alarm signals having zero value said second AC alarm signal having zero value and with both said third and fourth AC alarm signals of frequency ½ $f$ said second AC alarm signal having a frequency of $f$.

6. The device of claim 5 further including a third missing pulse detector coupled to said third comparator and being responsive to said third comparator signal having a nonregular square wave form to develop a third missing pulse alarm and a fourth missing pulse detector coupled to said fourth comparator and being responsive to said fourth comparator signal having a nonregular square wave form to develop a fourth missing pulse alarm.

7. The device of claim 6 further including a nuclear reactor ionization chamber for developing a power signal proportional to the neutron density incident thereon, a log N amplifier coupled to said chamber and said second comparator and being responsive to said power signal to develop the second input signal proportional to the log of said power signal, a differentiator coupled to said amplifier and said first comparator and being responsive to the first input signal to develop the second input signal proportional to the differentiation of the second input signal, a first sampler coupled to said amplifier and being responsive to the second input signal to develop said third input signal equal in value to the value of the first input signal at a particular instant, and a second sampler coupled to said amplifier and being responsive to the second input signal to develop said fourth input signal equal in value to the value of the first input signal at a particular instant.

8. A logical device for indicating the condition of the value of either of two input signals being in excess of respective trip levels, comprising: first DC means for developing a first DC signal corresponding to said first trip level, a first chopper comparator having applied thereto said first DC signal and being coupled to said first DC means, said first comparator being responsive to said first input signal and said first DC signal to develop a first comparator signal, with said first input signal less than said first DC signal said first comparator signal being a square wave of frequency ½ $f$ and with said first input signal equal to or greater than said first DC signal said first comparator signal having zero value, second DC means for developing a second DC signal corresponding to said second trip level, a second chopper comparator having applied thereto said second DC signal and being coupled to said second DC means, said second comparator being responsive to said second input signal and said second DC signal to develop a second comparator signal, with said second input signal less than said second DC signal said second comparator signal being a square wave of frequency ½ $f$ and with said second input signal equal to or greater than said second DC signal said second comparator signal having zero value, a first bandpass filter tuned to frequency ½ $f$ coupled to said first comparator and being responsive to the comparator signal thereof to develop a first AC alarm signal of frequency ½ $f$ with the comparator signal applied thereto of frequency ½ $f$ and of zero value with the comparator signal applied thereto not of frequency ½ $f$, a second bandpass filter tuned to frequency ½ $f$ coupled to said second comparator and being responsive to the comparator signal thereof to develop a second AC alarm signal of frequency ½ $f$ with the comparator signal applied thereto of frequency ½ $f$ and of zero value with the comparator signal applied thereto not of frequency ½ $f$, and an analog frequency multiplier coupled to said first and second bandpass filters and being responsive to said first and second AC alarm signals to develop an AC scram signal, with either of said first and second AC alarm signals having zero value said AC scram signal having zero value and with both said first and second AC alarm signals of frequency ½ $f$ said AC scram signal having a frequency of $f$.

9. The device of claim 8 further including a first missing pulse detector coupled to said first comparator and being responsive to said first comparator signal having a nonregular square wave form to develop a first missing pulse alarm and a second missing pulse detector coupled to said second comparator and being responsive to said second comparator signal having a nonregular square wave form to develop a second missing pulse alarm.

* * * * *